(12) United States Patent  
Suvakovic (10) Patent No.: US 8,086,104 B2  
(45) Date of Patent: Dec. 27, 2011

(54) SYSTEM, METHOD AND COMPUTER READABLE MEDIUM FOR PROVIDING DUAL RATE TRANSMISSION ON A GIGABIT PASSIVE OPTICAL NETWORK

(75) Inventor: Dusan Suvakovic, Marina del Rey, CA (US)

(73) Assignee: Alcatel Lucent, Paris (FR)

( * ) Notice: Subject to any disclaimer, the term of this patent is extended or adjusted under 35 U.S.C. 154(b) by 736 days.

(21) Appl. No.: 12/070,225

(22) Filed: Feb. 15, 2008

(65) Prior Publication Data

US 2009/0208207 A1    Aug. 20, 2009

(51) Int. Cl.  
*H04B 10/00* (2006.01)

(52) U.S. Cl. .......... 398/72; 398/100; 398/54; 398/57

(58) Field of Classification Search ............ 398/98–103  
See application file for complete search history.

(56) References Cited

U.S. PATENT DOCUMENTS

| | | | | |
|---|---|---|---|---|
| 4,201,892 A * | 5/1980 | Schmidt | 370/321 |
| 4,586,177 A * | 4/1986 | Kaul | 370/321 |
| 4,893,306 A * | 1/1990 | Chao et al. | 370/458 |
| 5,005,170 A * | 4/1991 | Nelson | 370/535 |
| 5,363,370 A * | 11/1994 | Abiven | 370/538 |
| 5,387,927 A * | 2/1995 | Look et al. | 725/114 |
| 5,446,734 A * | 8/1995 | Goldstein | 370/397 |
| 5,461,622 A * | 10/1995 | Bleickardt et al. | 370/470 |
| 5,526,346 A * | 6/1996 | Abiven | 370/295 |
| 6,160,823 A * | 12/2000 | Saintot | 370/538 |
| 6,275,544 B1 * | 8/2001 | Aiello et al. | 375/326 |
| 6,496,519 B1 * | 12/2002 | Russell et al. | 370/465 |
| 6,515,976 B1 * | 2/2003 | Dent et al. | 370/336 |
| 6,603,822 B2 * | 8/2003 | Brede et al. | 375/340 |
| 6,678,474 B1 * | 1/2004 | Masuda et al. | 398/75 |
| 6,842,787 B2 * | 1/2005 | Stadler et al. | 709/231 |
| 6,920,128 B1 * | 7/2005 | Haugli et al. | 370/348 |
| 6,944,148 B1 * | 9/2005 | Gehring et al. | 370/347 |
| 6,963,564 B1 * | 11/2005 | Liu | 370/389 |
| 6,999,446 B2 * | 2/2006 | Hall et al. | 370/349 |
| 7,292,605 B2 * | 11/2007 | Miyamoto | 370/485 |
| 7,480,324 B2 * | 1/2009 | Aiello et al. | 375/130 |
| 7,489,688 B2 * | 2/2009 | Giesberts et al. | 370/392 |
| 7,567,757 B2 * | 7/2009 | Shahar et al. | 398/102 |
| 7,590,118 B2 * | 9/2009 | Giesberts et al. | 370/392 |
| 7,660,309 B2 * | 2/2010 | Ikeda et al. | 370/392 |
| 7,675,936 B2 * | 3/2010 | Mizutani et al. | 370/466 |
| 7,688,855 B2 * | 3/2010 | Qian | 370/469 |
| RE41,417 E * | 7/2010 | Russell et al. | 370/532 |
| 7,782,812 B2 * | 8/2010 | Jao | 370/321 |
| 7,822,343 B2 * | 10/2010 | Song et al. | 398/58 |
| 2007/0104485 A1 * | 5/2007 | Zhang | 398/69 |
| 2007/0274718 A1 * | 11/2007 | Bridges et al. | 398/63 |
| 2008/0002977 A1 * | 1/2008 | Mori | 398/71 |

(Continued)

FOREIGN PATENT DOCUMENTS

WO    WO2007141100 A    12/2007

(Continued)

*Primary Examiner* — Agustin Bello  
(74) *Attorney, Agent, or Firm* — RG & Associates (57) ABSTRACT

In a dual rate gigabit passive optical network, an optical line termination (OLT) transmits a first rate (GPON) message frame interleaved with a second rate (NGPON) message frame. An unused ATM partition of the GPON message frame is provided with a header and payload portion of the NGPON message frame so that the message frame remains at a predetermined length required by the network.

23 Claims, 6 Drawing Sheets

U.S. PATENT DOCUMENTS

| | | | |
|---|---|---|---|
| 2008/0260385 A1* | 10/2008 | Eguchi | 398/75 |
| 2009/0116839 A1* | 5/2009 | Kikuchi et al. | 398/79 |
| 2009/0148167 A1* | 6/2009 | Tsunoda | 398/98 |
| 2009/0208207 A1* | 8/2009 | Suvakovic | 398/45 |
| 2009/0225914 A1* | 9/2009 | Ide et al. | 375/348 |

FOREIGN PATENT DOCUMENTS

WO    WO 2007141100 A1 * 12/2007

* cited by examiner

SYSTEM, METHOD AND COMPUTER READABLE MEDIUM FOR PROVIDING DUAL RATE TRANSMISSION ON A GIGABIT PASSIVE OPTICAL NETWORK

FIELD OF THE INVENTION

This invention relates to gigabit passive optical networks (GPON)s and in particular to GPONs providing dual rate transmission.

BACKGROUND OF THE INVENTION

Gigabit-capable Passive Optical Networks (GPON), specified by ITU-T Recommendations G.984.1, G.984.2, G.984.3 and G.984.4, are widely adopted by network operators across the world as the broadband access network of choice. With bit rates of 2.488 Gbps in the downstream and 1.244 Gbps in the upstream direction, GPON provides high enough bandwidth per user to enable efficient simultaneous delivery of services such as voice, internet access, broadcast television, video on-demand (VOD) and high definition television (HDTV) etc. However, with the emergence of new services delivered over access networks, the demand for bandwidth is anticipated to grow beyond the capacity of GPON. To meet this demand, standardization of the Next-generation of GPON (NGPON), featuring higher bit rates, is being considered. In the early discussions about NGPON, network operators have emphasized the need for compatibility of NGPON and GPON, that would warrant co-existence of these two systems on the same physical PON, without disrupting each others operation. This approach would be cost-effective for the network operators because it would allow phased upgrade of the GPON infrastructure, without the need to upgrade customer premises equipment (CPE) for those customers who prefer to stay subscribed to the old, less expensive GPON service.

To achieve this goal, compatibility of NGPON and GPON must be achieved at both the physical (PHY) and media access control (MAC) layer. A system and method for solving the physical layer is disclosed in the Applicant's co-pending application Ser. No. 12/074,692, the entire contents of which are explicitly incorporated herein by cross reference.

What is required is a system and method for providing compatibility of NGPON and GPON at the MAC layer.

SUMMARY OF THE INVENTION

In accordance with one aspect of the disclosure, there is provided a passive optical network comprising at least one optical line termination; at least one first optical network termination operating at a first rate; at least one second optical network termination operating at a second rate; wherein said at least one optical line termination transmits at least one message frame to at least one of the at least one first optical network termination and the at least one second optical network termination, the at least one message frame comprising a first rate header; a first partition comprising a second rate header and a second rate payload; and a second partition comprising a first rate payload.

In accordance with one aspect of the disclosure, there is provided a method for transmitting a signal from an optical line termination comprising transmitting a first header at a first rate; transmitting a second header at a second rate; transmitting a first payload at the first rate; and transmitting a second payload at the second rate.

In accordance with one aspect of the disclosure, there is provided a method for processing a signal received in an optical network termination operating at one of a plurality of operating rates of a passive optical network, the method comprising determining a message frame of said signal; determining a header of said message frame transmitted at the operating rate of the optical network termination; determining a data signal of said message frame transmitted at a rate of the operating rate of the optical network termination; and processing said data signal.

In accordance with one aspect of the disclosure, there is provided an optical line termination comprising a signal generator for generating a transmission signal on a passive optical network, the transmission signal including a frame format comprising a first header; a second header; a first data signal; and a second data signal; wherein the optical line termination transmits the first header and the first data signal at a first transmission rate; and wherein the optical line termination transmits the second header and the second data signal at a second transmission rate.

In accordance with one aspect of the disclosure, there is provided a computer readable medium comprising instructions for generating a plurality of first message frames, each first message frame comprising a first header, a first payload portion and a first unused portion; generating a plurality of second message frames, each second message frame comprising a second header, a second payload portion and a second unused portion; and interleaving said first and second message frames such that said second header and said second payload portion are provided in said first unused portion and said first header and said first payload portion are provided in said second unused portion.

BRIEF DESCRIPTION OF THE DRAWINGS

The invention will now be described, by way of example only, with reference to specific embodiments and to the accompanying drawings in which.

DETAILED DESCRIPTION OF THE INVENTION

Figure 1:
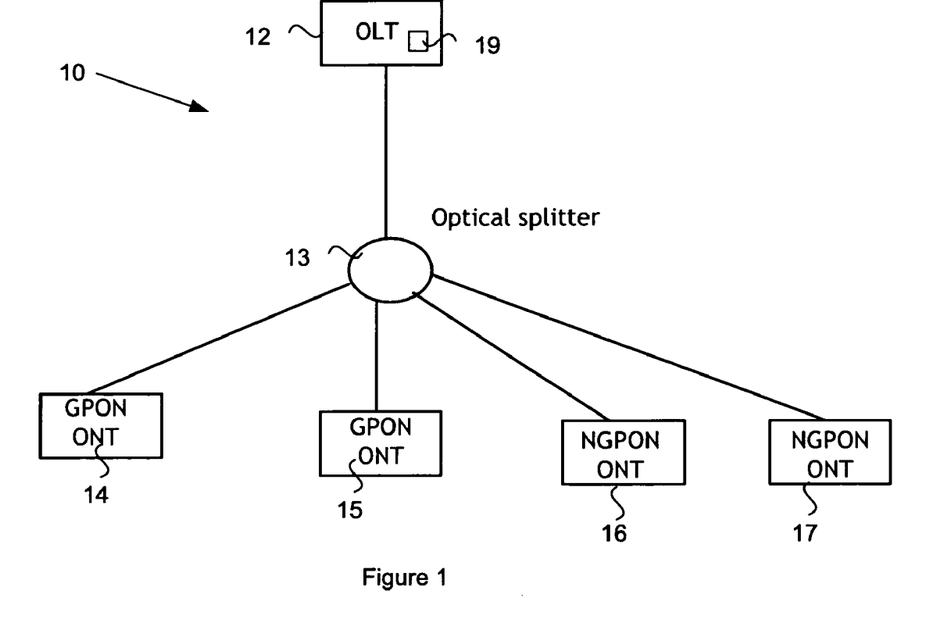
FIG. 1 schematically shows a gigabit passive optical network.
Figure 2:
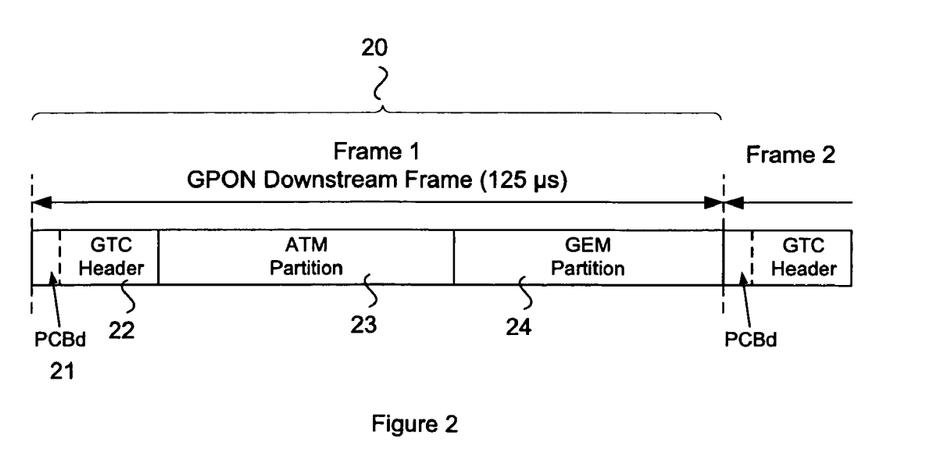
FIG. 2 shows a typical frame format for a single rate passive optical network.

With reference to FIG. 1, there is shown an optical network 10 having a passive optical splitter 13, a dual-rate capable optical Line Terminal (OLT) 12 residing at the central office, a number of GPON Optical Network Terminals (ONT) 14, 15 and a number of NGPON ONTs 16, 17 residing at customer premises (CP). In one embodiment, the GPON ONTs 14, 15 are configured for operation at a first data rate, such as 2.5 Gb/s and the NGPON ONTs are configured for operation at a second, faster data rate such as 10 Gb/s. GPON standard (ITU Rec. G.984.3) mandates the OLT 12 to transmit a continuous sequence of 125 μs long, back-to-back GPON Transmission Convergence (GTC) downstream frames. An example of a downstream message frame is illustrated in FIG. 2. Each message frame 20 includes a Physical Control Block downstream (PCBd) header 21 in a GTC header 22, followed by the payload section. The payload section typically has two partitions, an ATM partition 23 and a GEM partition 24. Network operators adopting GPON worldwide have typically opted to use only the GEM partition 24 to transport Ethernet and TDM frames. The ATM partition 23, on the other hand, is unused and its size field in the PCBd 21 is typically set to zero. In accordance to G.984.3 standard, the GPON ONTs 14, 15 are typically designed to receive only GEM payload 24, while ignoring the contents of the ATM partition 23.

If the dual-rate OLT 12 were sending GPON and NGPON downstream frames alternately, i.e. a GPON frame in one 125 μs interval and a NGPON frame in the next, the G.984.3 standard would be violated in several ways. Firstly, the transmission of downstream frames would not be contiguous as mandated by G.984.3. Secondly, the lack of the expected GPON Physical synchronization (Psync) field in the NGPON header would make ONT activation difficult or impossible (clause 10.2) because an ONT needs to receive at least two valid back-to-back frames in order to move beyond its initial power-up state. Other standard violations would include the GPON ONTs inability to interpret a bit-interleaved parity (BIP) field in the NGPON frame and calculate BIP in order to measure the number of errors on the link (per G.984.3, clause 8.1.3.4). Also, GPON ONTs would not be able to use the IDENT field of the GPON GTC header properly, which would impair the encryption and FEC control mechanism.

It is reasonable to expect that alternate transmission of GPON and NGPON frames would confuse the previously deployed GPON ONTs and cause them to fail. It is also reasonable to expect that the newly deployed NGPON ONTs would be affected in a similar way. Therefore, a different MAC layer multiplexing scheme is necessary for successful implementation of the dual-rate GPON.

Figure 3:
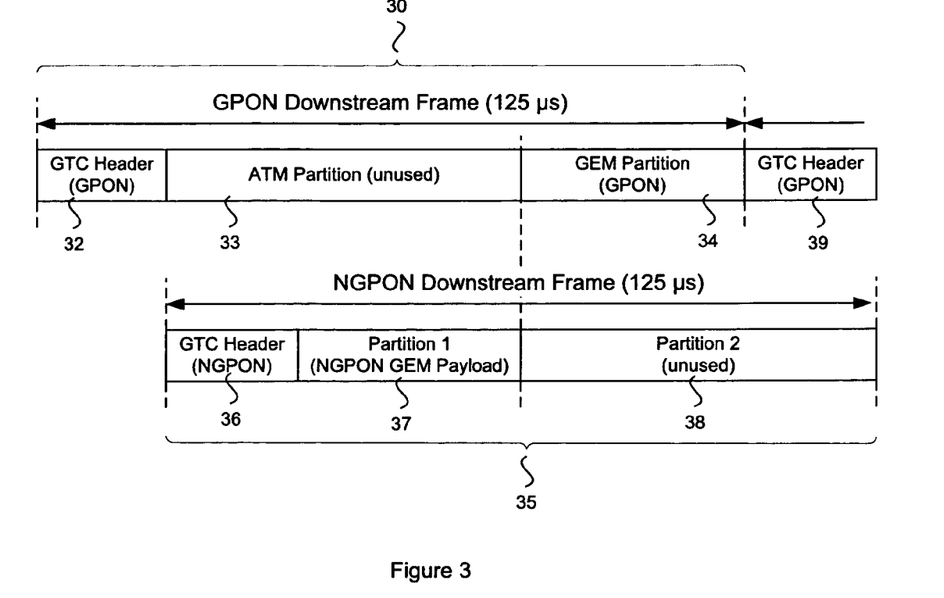
FIG. 3 shows dual rate frame formats for a dual rate passive optical network.

In accordance with an embodiment of the disclosure, a system and method of frame interleaving, as illustrated in FIG. 3, can be used to ensure continuous and simultaneous transmission of both GPON and NGPON downstream frames. Frame interleaving utilizes the unused ATM partition in the GPON downstream frame. It is assumed that the NGPON format is similar to that of GPON, consisting of a GTC-like header, followed by two partitions.

An interleaved frame can be considered as being constructed from separate GPON 30 and NGPON 35 frames. The GPON frame 30 is similar to the frame described with reference to FIG. 2. Specifically, each GPON frame 30 includes a GPON header 32 which allocates a non-zero size to the ATM partition 33, but the ATM partition 33 is unused. The GEM partition 34 of the GPON frame carries the usual GPON payload. The NGPON frame 35 includes an NGPON GTC header 36 followed by an NGPON payload 37 in partition 1 which may be provided in a GEM format. The second partition 38 of the NGPON frame 35 is unused. Each of the GPON and NGPON frames 30, 35 are constructed to be the mandatory 125 μs long. In addition, the combined length of the NGPON header 36 and NGPON payload 37 are constructed to be of the same length as the unused ATM partition 33 of GPON frame 30 while the unused partition 38 of the NGPON frame 35 is of equivalent length to the GEM payload of GPON frame 30.

Figure 4:
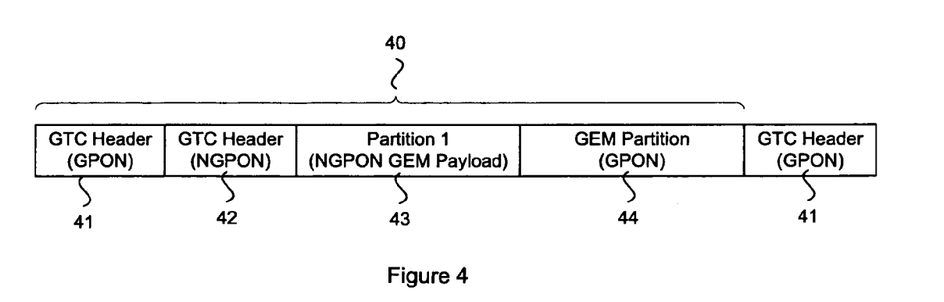
FIG. 4 shows an interleaved frame format.

The GPON frame 30 is interleaved with the NGPON frame 35 such that the end of the NGPON GEM partition 37 is aligned with the end of the GPON ATM partition 33. A resultant interleaved frame 40 that is transmitted by the dual rate OLT is illustrated in FIG. 4. The frame 40 commences with a GPON GTC header 41 followed by an NGPON GTC header 42, an NGPON payload 43 and a GPON payload 44. The NGPON GTC header 42 and NGPON payload 43 collectively occupy a space defined in the GPON GTC header 41 as belonging to an ATM partition of the GPON frame. Similarly, the unused partition 38 of the NGPON frame 35 correlates to the GEM payload partition 34 of the GPON frame 30 and the next GPON header 39 of the next GPON frame 30.

Figure 10:
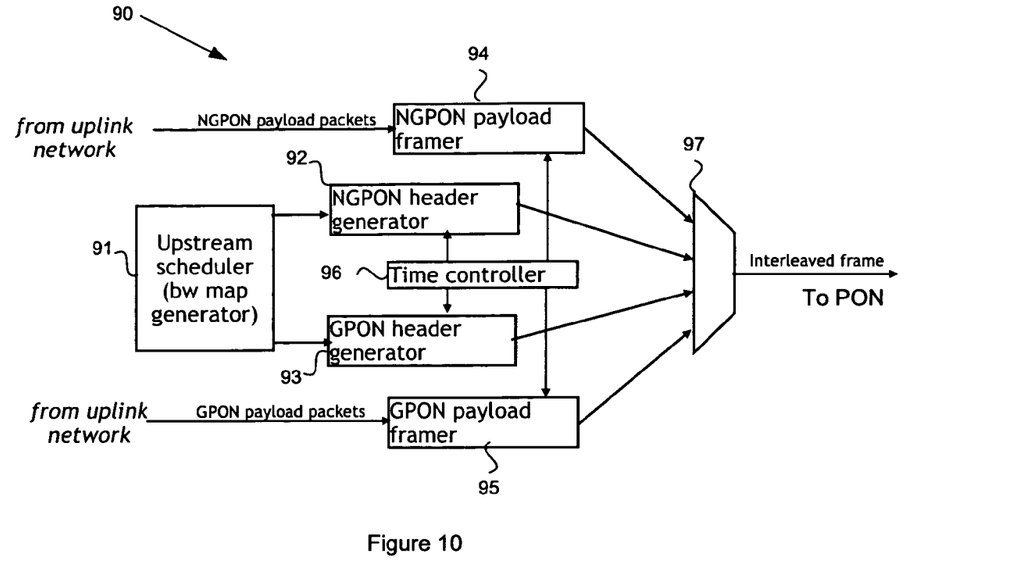
FIG. 10 shows a framing system.

A framing system 90 is illustrated in FIG. 10. In the framing system 90, an upstream scheduler 91 such as a BW Map generator schedules header frames produced by an NGPON header generator 92 and GPON header generator 93. An NGPON payload framer 94 receives NGPON payload packets from an uplink network (not shown). Similarly, a GPON payload framer 95 receives GPON payload packets from an uplink network (not shown). Under the control of a time controller 96, the respective headers and payloads provided to interleaving component 97 are interleaved to produce the interleaved frame that is forwarded down the network. The payload packets are tiled into the frame, one by one, for the duration of their respective partitions.

Figure 11:
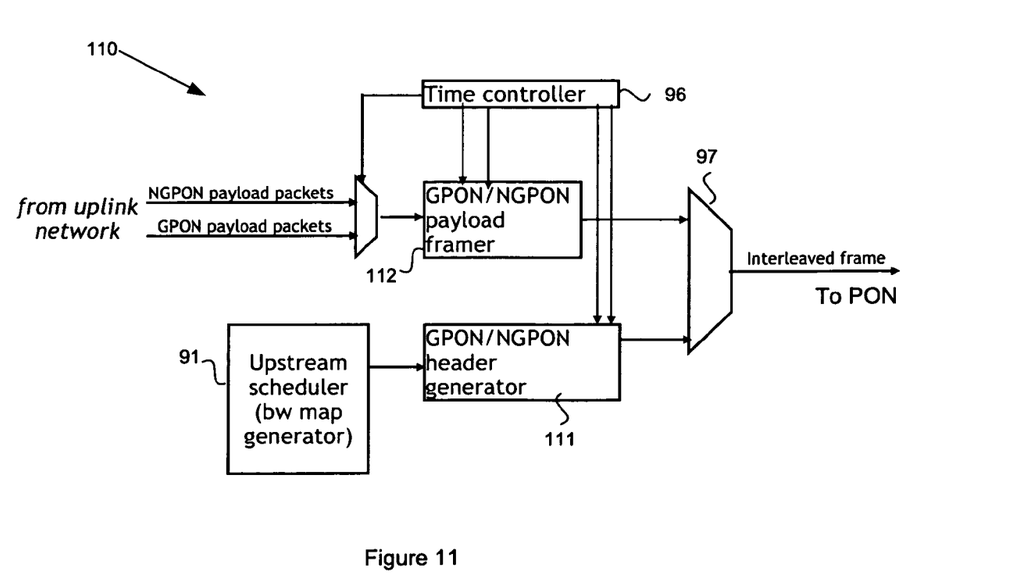
FIG. 11 shows a framing system using shared resources.

Since the GPON and NGPON headers are never generated simultaneously yet have the same general structure, they can both be generated by the same processing unit. The same applies to framing of payload packets. FIG. 11 illustrates a shared resource framing system 110 in which a combined GPON/NGPON header generator 111 is provided together with a combined GPON/NGPON payload framer 112 which receives both NGPON and GPON payload packets with the time controller 96 toggling the packet rate between the two network rates. This embodiment provides a cheaper implementation solution due to the sharing of resources.

Figure 5:
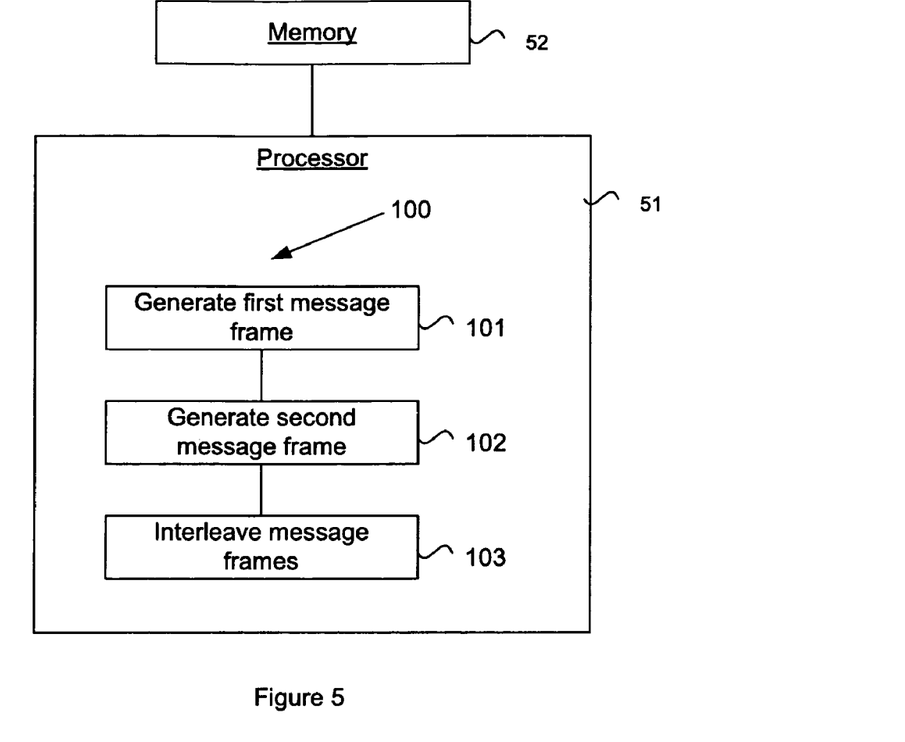
FIG. 5 shows an instruction set executed by a processor.

In one embodiment, all or a portion of the message frame 40 may be generated via a computer readable medium that comprises instructions (i.e. software) which can be fully or partially executed by or run on one or more of the described and depicted elements. For example, as illustrated in FIG. 5, an OLT 12 may include a processor 51 operatively associated with a memory 52 that stores an instruction set 100. The instruction set 100 may be executed by the processor 51 to generate a first message frame 30 (step 101), generate a second message frame 35 (step 102) and interleave the first and second message frames to produce the resultant message frame 40. In one embodiment, the depicted and described processor(s) run at an appropriate speed to effectively interleave the frames and/or perform the functions described herein. In another embodiment, one or more of the processor(s) can be located "off-board" in an alternate location which may be better suited to run at the appropriate speed to effectively interleave the frames and/or perform the functions described herein.

Figure 6:
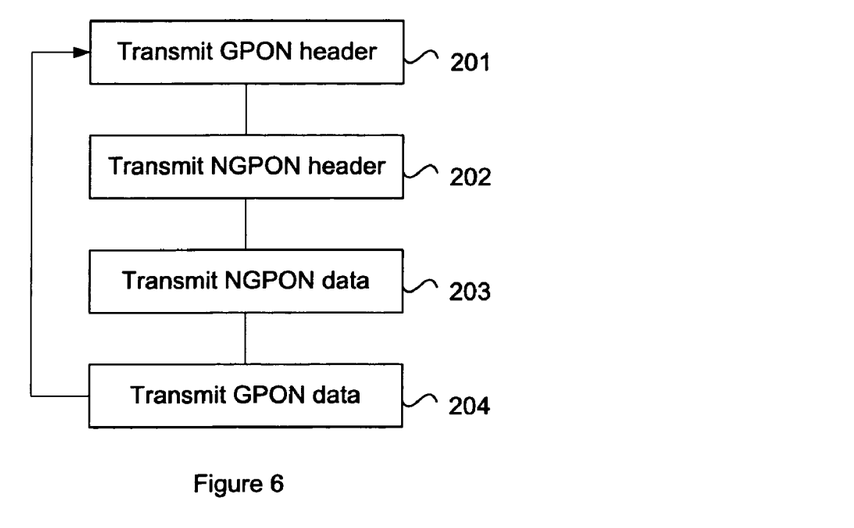
FIG. 6 shows a flowchart of steps performed in transmitting the dual rate frame format of FIG. 4.

A process using the interleaved frame 40 of FIG. 4 will now be described with reference to FIG. 6. As a first step 201, the OLT transmits the GPON GTC header 41 at the data rate of the GPON ONT. At the beginning of the usual ATM partition, the OLT switches to the higher NGPON data transmission rate and starts transmitting the GTC header 42 of the NGPON frame (step 202). The NGPON GTC header is followed by the NGPON payload partition 43 (203). At the end of the NGPON payload partition, the dual-rate OLT "shifts gear" again to the lower GPON data transmission rate and starts transmitting the payload of the GPON GEM partition (step 204). The GPON GEM partition ends exactly 125 μs after the beginning of the GPON GTC frame, so it is followed by the next GPON GTC header.

As described above, GPON ONTs are typically configured to ignore the ATM partition, and thus the data conveyed by the NGPON GTC header 42 and NGPON payload 43 will not be processed by a GPON ONT. Similarly, the NGPON ONTs may be configured to ignore the second partition 38 of the NGPON frame 35, which corresponds to the GPON GEM payload 44 of the interleaved frame 40 and therefore contains no relevant NGPON data.

Figure 7:
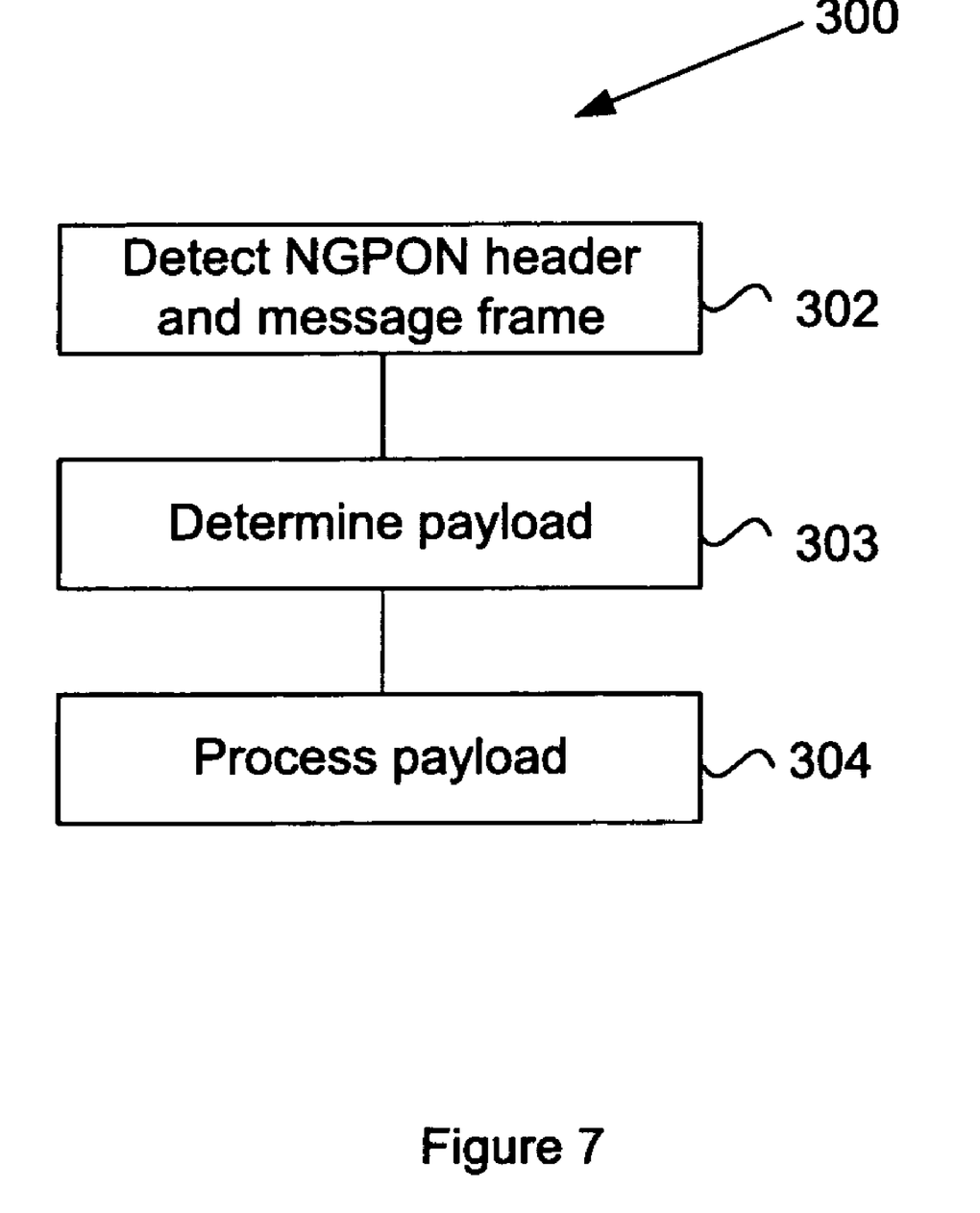
FIG. 7 shows a flowchart of steps performed by an optical network termination in receiving the dual frame format of FIG. 4.

A process performed by the NGPON ONTs 16, 17 of the network 10 illustrated in FIG. 1, will now be described with reference to the flowchart 300 of FIG. 7. The NGPON ONTs receive a transmission from the OLT which may include a message frame, such as the message frame 40 depicted in FIG. 4. At step 302, the NGPON ONT detects the NGPON header and determines a message frame. The ONT may then determine the location of the NGPON payload 43 provided by the frame 40 (step 303) and proceed to process the NGPON data provided in the payload 43 (step 304).

In one embodiment, the OLT 12 keeps the size of its GTC header constant, by keeping the length of its bandwidth map (BWmap) the same in every GTC frame, which ensures that the total duration of the GPON GEM partition and the following GPON GTC header exactly matches the duration of the idle second partition in the NGPON frame. In one embodiment, the NGPON GTC header is always transmitted immediately after the GPON GTC header which, combined with the constant length of the GTC header, makes every NGPON GTC frame exactly 125 µs long. The constant frame can thus provide an 8 kHz time reference needed for voice and similar services.

Figure 8:
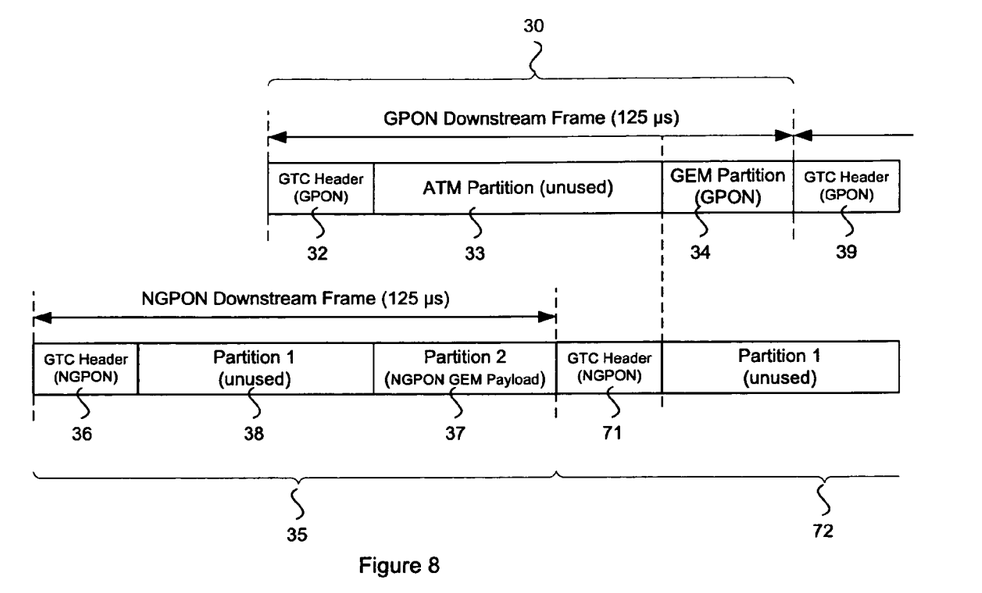
FIG. 8 shows alternative dual rate frame formats.
Figure 9:
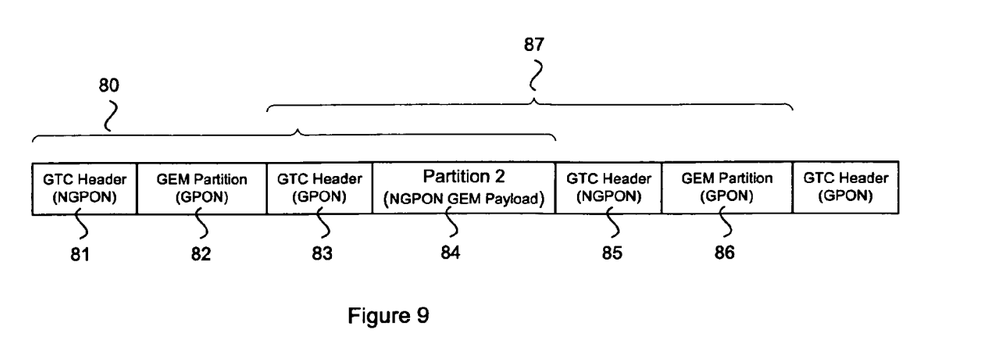
FIG. 9 shows an alternative interleaved frame format.

In an alternative embodiment illustrated in FIG. 8, the frame order is adjusted. In this embodiment, the NGPON frame has an NGPON GTC header 36 followed by an unused first partition 37. The NGPON payload is thus provided in the second partition 38. The GPON frame 30 is interleaved with the NGPON frame 35 so that together, the NGPON payload 38 of frame 35 and the NGPON header 71 of the next NGPON frame 72 are aligned with the unused ATM partition 33 of the GPON frame 30. The frame transmitted by the dual rate OLT is illustrated in FIG. 9 and includes the NGPON frame 80 and GPON frame 87. The NGPON frame 80 has an NGPON header 81 followed by the GPON GEM payload 82, GPON header 83 and then the NGPON payload 84. From the point of view of the GPON frame 87, there is the GPON header 83 followed by the NGPON payload 84, NGPON header 85 and then the GPON payload 86.

In the present embodiments, it is assumed that the problem of physical layer multiplexing is solved such that the GPON ONTs stay locked for the duration of the transmission of NGPON frames and vice versa. Physical layer multiplexing can be solved using the system and method described in the Applicant's co-pending application referenced above in which clock signals, i.e. non-data signals, are provided for idle ONTs in the data signals, i.e. payloads, of the active ONTs partitions. In order for BIP to be computed equally on the OLT and ONT side, it is also assumed that the physical layer solution ensures unambiguous interpretation of the NGPON bit stream by GPON ONTs and GPON bit stream by NGPON ONTs for the duration of their respective unused payload partitions, by the OLT and the ONTs.

One advantage of the above described embodiments is that it allows the NGPON protocol to be designed as a replica of the GPON protocol, with some fields adjusted for the higher number of bytes in the 125 µs frame, without any special provisions for dual-rate operation. Once all ONTs in a PON are upgraded to NGPON, the OLT operation can seamlessly turn to the single-rate NGPON protocol by reducing the size of the second—unused NGPON partition 38 to zero.

A further advantage is that the sizing of the GPON and NGPON GEM payload partitions is flexible. The sizing of the partitions can be performed statically, based on the number and ratio of the GPON and NGPON ONTs in the network. Alternatively, the sizing can be performed dynamically, on a frame-to-frame basis, to accurately match the instantaneous bandwidth needs of the two networks, thus minimizing latency and maximizing downstream bandwidth efficiency.

A further advantage is that maximum reuse of hardware resources between the GPON and NGPON OLTs is provided, thus minimizing the cost of the dual-rate GPON. For example, hardware modules such as the downstream framer, upstream parser, encryption engine, FEC engine, scrambler and descrambler can be shared between the GPON and NGPON OLT by being clocked at different rates during their respective operation. Clocking at different rates can be achieved, for example, by clock gating, which is a well known digital technique.

The above described embodiments enable design of a backward compatible next-generation GPON, meeting the need and fulfilling the request of the major network operators.

Throughout the above description and in the following claims, it is to be understood that the terms first, second and similar are not intended to denote a chronological order, except where explicitly stated. Furthermore, the person skilled in the art will readily understand that in the following claims, steps of a method are not necessarily performed in the order listed and may be performed in an order other than the order described.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A passive optical network comprising:
   at least one optical line termination;
   at least one first optical network termination operating at a first rate;
   at least one second optical network termination operating at a second rate;
   wherein said at least one optical line termination transmits at least one message frame to at least one of the at least one first optical network termination and the at least one second optical network termination, the at least one message frame comprising:

a first rate header;
a first partition comprising a second rate header and a second rate payload; and
a second partition comprising a first rate payload;
wherein the first rate header, a second rate header, and the second partition are transmitted before the first rate payload is transmitted.

2. The passive optical network according to claim 1 wherein said second rate is faster than said first rate.

3. The passive optical network according to claim 2 wherein said first rate is 2.5 Gb/s and wherein said second rate is 10 Gb/s.

4. The passive optical network according to claim 1 wherein said message frame is a predetermined length.

5. The passive optical network according to claim 4 wherein said predetermined length is 125 microseconds.

6. The passive optical network according to claim 1 wherein said second optical network termination processes said second rate header and said second rate payload and ignores said second partition and said first rate header.

7. The passive optical network according to claim 1 wherein said first rate header is of a constant length.

8. The passive optical network according to claim 1 wherein said first rate header is one of a plurality of said at least one message frames.

9. The passive optical network according to claim 8 wherein a next first rate header of a next message frame immediately follows said second partition.

10. The passive optical network according to claim 1 wherein said first optical network termination processes said first rate header and said second partition and ignores data of said first partition.

11. The passive optical network according to claim 1 wherein an end of said second rate payload is aligned with an end of said first partition.

12. A method for transmitting a signal from an optical line termination comprising:
transmitting a first header at a first rate;
transmitting a second header at a second rate different from the first rate after the transmitting of the first header at the first rate;
transmitting a first payload at the first rate associated with the first header; and
transmitting a second payload at the second rate associated with the second header, the second payload being transmitted before the first payload is transmitted;
wherein a first partition in said first header is defined and said second header and said second payload is transmitted within said first partition; and
wherein an end of said second rate payload is aligned with an end of said first partition.

13. The method according to claim 12 wherein said first header, said second header, said first payload and said second payload together form a message frame of a predetermined length.

14. The method according to claim 13 comprising transmitting a plurality of said message frames.

15. A method for processing a signal received in an optical network termination operating at one of a plurality of operating rates of a passive optical network, the method comprising:
determining a message frame of said signal received;
determining a first header of said message frame transmitted at a first operating rate of the optical network termination and a second header transmitted at a different rate from the operating rate of the optical network termination;
determining at least one payload of said message frame transmitted at the different rate from the operating rate of the optical network termination; and
transmitting the first header, the second header, and a portion of the at least one payload before another portion of the payload is transmitted.

16. The method according to claim 15 wherein said first header defines a location in said message frame of said data signal.

17. The method according to claim 15 wherein said first header defines a portion of said message frame that is unused by the optical network termination.

18. The method according to claim 17 wherein the unused portion of said message frame comprises a portion transmitted at an operating rate different to the operating rate of the optical network termination.

19. The method according to claim 18 wherein the operating rate of the optical network termination is faster than at least one other operating rate of the passive optical network.

20. An optical line termination comprising a signal generator for generating a transmission signal on a passive optical network, the transmission signal including a frame format comprising:
a first header;
a second header;
a first data signal; and
a second data signal;
wherein the optical line termination transmits the first header and the first data signal at a first transmission rate, the first data signal corresponding to the first header; and
wherein the optical line termination transmits the second header and the second data signal at a second transmission rate different from the first transmission rate, and wherein the second header and the second data signal are transmitted before the first data signal.

21. An optical line termination according to claim 20 wherein the first header has a constant length.

22. A non-transitory computer readable storage medium comprising instructions that when executed cause a processor to perform:
generating a plurality of first message frames, each first message frame comprising a first header, a first payload portion and a first unused portion;
generating a plurality of second message frames, each second message frame comprising a second header, a second payload portion and a second unused portion;
interleaving said first and second message frames such that said second header and said second payload portion are provided in said first unused portion of the first message frame and said first header and said first payload portion are provided in said second unused portion of the second message frame; and
transmitting an interleaved data frame, wherein the first header, the second header and the second payload portion are transmitted before the first payload portion corresponding to the first header is transmitted.

23. A non-transitory computer readable storage medium according to claim 22 wherein each of said first message frames and said second message frames are 125 microseconds long.

* * * * *